United States Patent [19]  [11] 3,993,157
Schulte  [45] Nov. 23, 1976

[54] DOOR OPERATED CONTROL LEVER LATCH MECHANISM
[75] Inventor: Gary Lee Schulte, Dubuque, Iowa
[73] Assignee: Deere & Company, Moline, Ill.
[22] Filed: Aug. 4, 1975
[21] Appl. No.: 601,381

[52] U.S. Cl. ................................ 180/111; 74/475; 74/527; 192/135
[51] Int. Cl.² ...................................... B60K 28/00
[58] Field of Search .......... 180/111, 112, 113, 82 R, 180/103, 82 A, 82 B, 77 R, 1 R, 77 H, 77 HT; 296/146, 65 A; 74/475, 527; 192/135, 136

[56] References Cited
UNITED STATES PATENTS

| | | | |
|---|---|---|---|
| 1,664,042 | 3/1928 | McGinley | 70/237 X |
| 2,605,776 | 8/1952 | Lyman | 192/135 X |
| 2,866,511 | 12/1958 | Niederoest | 180/111 |
| 2,945,546 | 7/1960 | Niederoest | 180/111 |
| 3,110,354 | 11/1963 | Bulger | 180/111 |
| 3,285,361 | 11/1966 | Baker | 180/82 A |
| 3,431,793 | 3/1969 | Boston | 74/527 X |
| 3,788,685 | 1/1974 | Leichtl | 180/112 X |

Primary Examiner—M. H. Wood, Jr.
Assistant Examiner—Milton L. Smith

[57] ABSTRACT

A vehicle is provided with a control lever which is mounted in a vehicle cab so as to be incorporated in a housing supporting the left arm rest of the operator seat. The control lever is of a type movable among various positions for actuating hydraulic valves for controlling equipment attached to the vehicle and a normal neutral position for neutralizing the control valves. Fixed to the control lever is a pin which projects vertically when the lever is in its neutral position and a vertically swingable latch member is biased towards a latched position wherein it receives the vertical pin and holds the control lever in its neutral position. The latch member includes a pin which extends crosswise to the axis of and below the pivot of the latch member at a location whereat it is engageable by a bumper carried by the door when the door is closed so as to move the latch member upwardly to a deactivated position permitting the control lever to be operated when the vehicle door is closed.

12 Claims, 4 Drawing Figures 3,993,157

DOOR OPERATED CONTROL LEVER LATCH MECHANISM

BACKGROUND OF THE INVENTION

The present invention relates to a control lever locking mechanism and more particularly relates to a locking mechanism which is activated by opening the door and deactivated by closing the door of the vehicle.

Control levers which are convenient to the operator when seated are often times an obstacle to his entry and exit, and when bumped, may be moved to an actuated position initiating operation of a power control device connected to the vehicle thus creating a safety hazard.

SUMMARY OF THE INVENTION

According to the present invention there is provided a control lever locking mechanism associated with a control lever which is positioned in a vehicle cab so as to be convenient to a seated operator.

It is an object of the invention to provide a control lever locking mechanism which is selectively operable to lock a control lever in its neutral position.

A more specific objective is to provide a control lever locking mechanism which is simple in construction and activated only when an unsafe situation is present.

More specifically, it is an objective to provide a locking mechanism which is activated and deactivated respectively by opening and closing the door of the operator's cab.

These and other objects will become more apparent from a reading of the following description taken with the appended drawings.

DESCRIPTION OF THE PREFERRED EMBODIMENT

Figure 1:
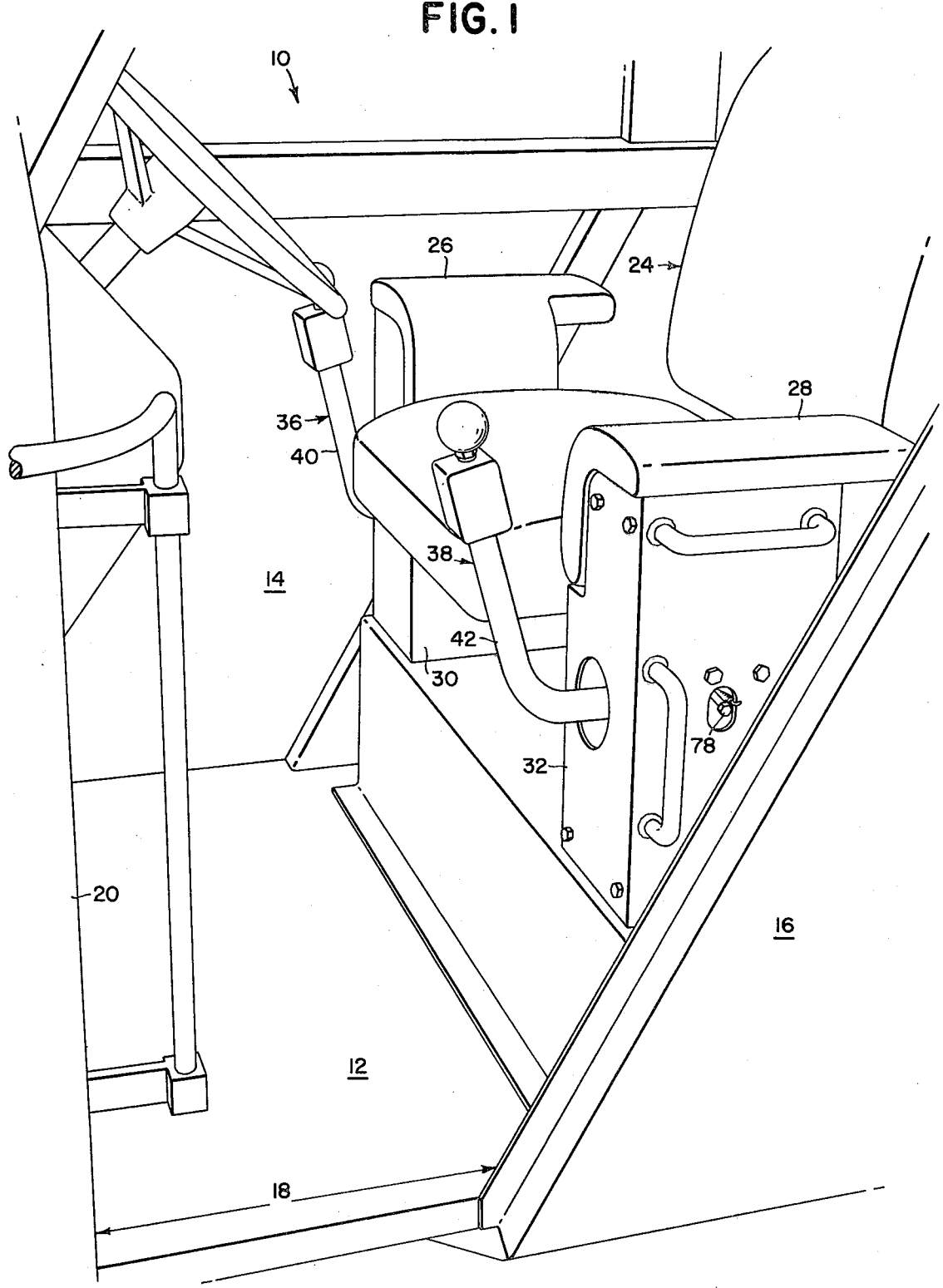
FIG. 1 is a left front perspective view showing a portion of the interior of a vehicle cab in which a control lever and locking mechanism therefore is embodied in accordance with the principles of the present invention.

Referring now to FIG. 1, therein is a partial showing of a vehicle cab indicated in its entirety by the reference numeral 10. The cab 10 includes a floor 12 and upstanding right and left side walls 14 and 16, respectively. A door opening 18 is provided in the left side wall 16 and a door shown partly at 20 is hingedly mounted in a conventional manner (not shown) for swinging about a vertical axis at the forward edge of the opening 18 for movement between an open position, as shown, relative to the opening 18 and a closed position. For a more detailed showing of the shape of the door 20, please refer to co-pending application, Ser. No. 534,734, filed on Dec. 20, 1974 and having the same assignee as does the present application.

Mounted on the floor 12 of the cab 10 is an operator's seat 24 having right and left arm rests 26 and 28, respectively, which form the top of right and left hollow, box-like housing 30 and 32, respectively. For the purpose of selectively actuating hydraulic control valves (not shown) for controlling the operation of hydraulically powered devices associated with the vehicle, right and left control linkages 36 and 38, respectively, are mounted in the right and left housings 30 and 32. The linkages 36 and 38 respectively include right and left control levers 40 and 42, respectively, which project through respective openings provided in the front sides of the housings 30 and 32, only the opening in the left housing 32 being visible in the drawings. As the left linkage 38 is the only one of the control linkages that is involved in the present invention, it is the only one that is illustrated in detail.

Figure 2:
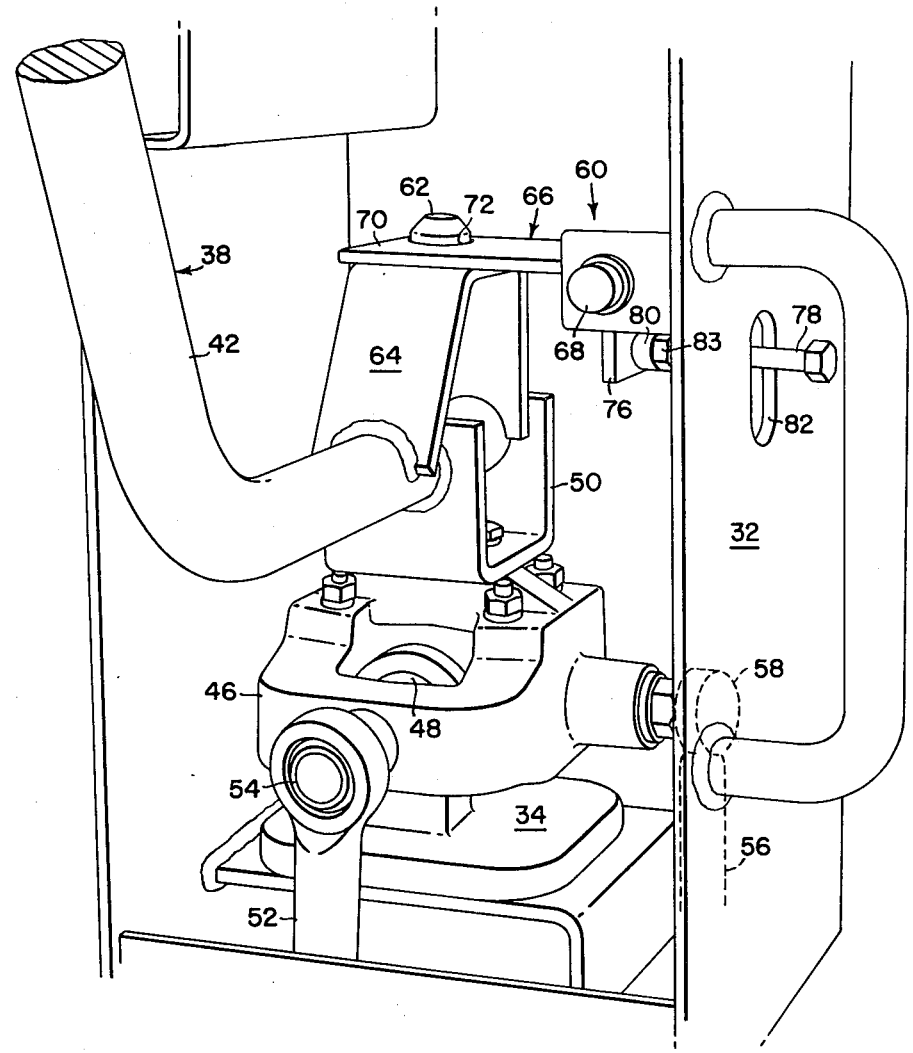
FIG. 2 is a left front perspective view of the control lever and locking mechanism therefor with the control lever being shown in its neutral position and the locking mechanism being shown in its latched position.
Figure 3:
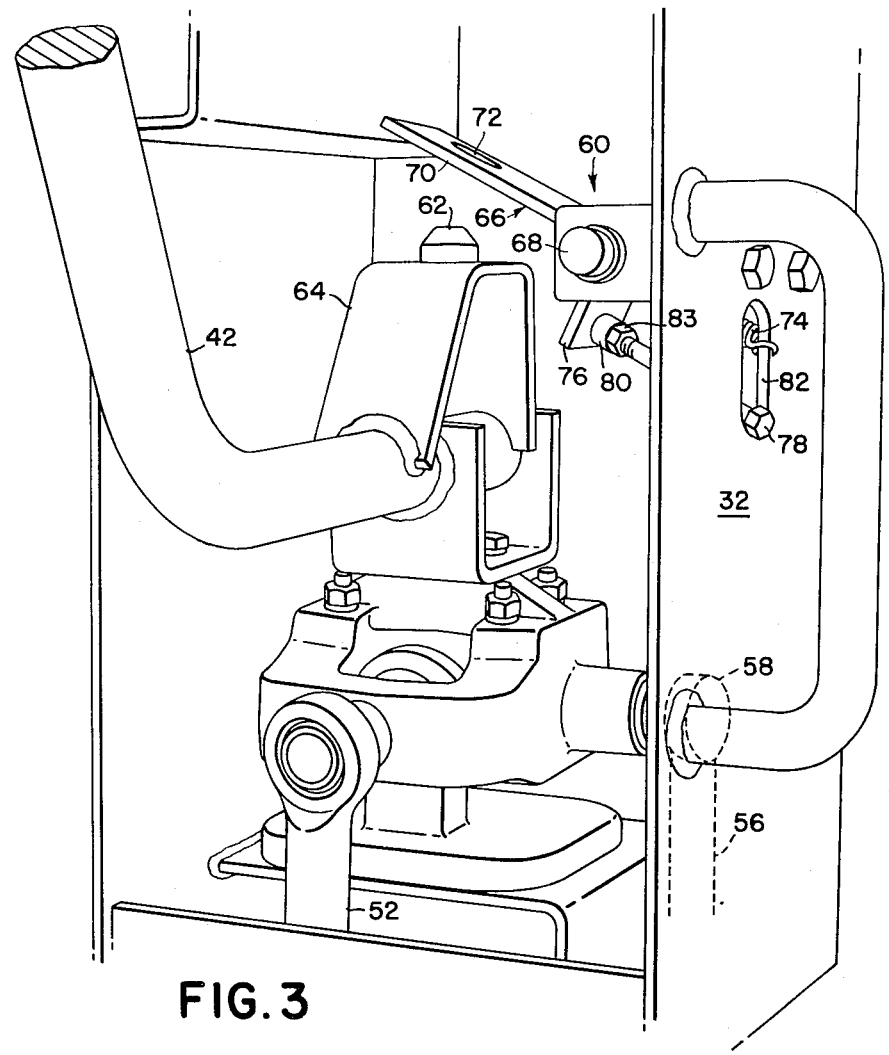
FIG. 3 is a perspective view similar to FIG. 2 but showing the locking mechanism in its deactivated position permitting unhindered operation of the control lever.
Figure 4:
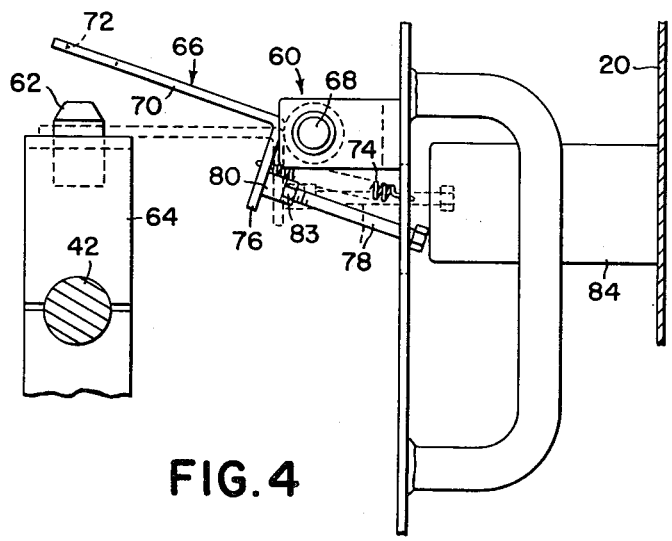
FIG. 4 is a front elevational view showing a portion of the control lever and the vehicle door and showing the door in operative engagement with the latch member and holding the latter in its deactivated position, the latch member being shown in dashed lines in its operative position.

Accordingly, as can best be seen in FIGS. 2–4, the left control linkage 38 includes a fixed mounting base 34 to which a member 46 is universally connected by means shown partially at 48. The left lever 42 has an end fixed to a U-shaped bracket 50 which is connected to the top of the member 46. A first control rod 52 has its upper end universally connected, as at 54, to the member 46 at a forward location thereof in axial alignment with the universal connection 48 and a partly shown control rod 56 has its upper end universally connected as at 58 to the left side of the member 46 at a location in axial alignment with the universal connection 48. Thus, it will be appreciated that the first control rod 52 may be raised and lowered respectively by fore-and-aft movement of the lever 42 while the second control rod 56 may be raised and lowered independently of the first control rod 52 by sideways movement of the lever 42. Preferably the first and second control rods 52 and 56, respectively, would be connected to first and second control valves (not shown) for selectively actuating respective valve members of the latter to first and second active positions located on opposite sides of a neutral position.

As illustrated here, the lever 42 is shown in a neutral position wherein the first and second control rods 52 and 56 are respectively in intermediate positions corresponding to neutral positions which are normally maintained by biasing springs in the valves to which the rods 52 and 56 are connected. Associated with the left control linkage 38 for locking the lever 42 in its illustrated neutral position is a locking mechanism indicated generally at 60. The locking mechanism 60 includes a short pin 62 fixed to the control lever 42 through means of a bracket 64 and arranged such that it projects vertically when the control lever 42 is in its neutral position as shown. A lock member 66 is pivotally mounted on the left housing 32 through means of a fore-and-aft horizontal pivot pin 68. As viewed in FIG. 2, the lock member 66 includes a horizontal strap portion 70 provided with a vertical opening 72 having the pin 62 received therein. Thus, the lock member 66 is in its locked position and it is biased to this position through means of a tension spring 74 connected between a vertical leg portion 76 of the member 66 and the housing 32. A horizontal actuating rod 78 in the form of a cap screw is adjustably threaded in a boss 80 provided on the depending leg 76 and extends leftwardly through a hole 82 provided in the left side of the housing 32. A jam nut 83 holds the rod 78 in the proper position for engagement by a bumper or abutment member 84 (FIG. 4) fixed to the inside of the door 20 so as to hold the lock member 66 in a deactivated position as shown in solid lines in FIG. 4 wherein the strap portion 70 is elevated above and out of engagement with the pin 62 when the door 20 is closed. It will be appreciatd then that upon opening the door 20 the spring 74 will act to move the lock member 66 to its locked position shown in dashed lines in FIG. 4.

The operation of the locking mechanism 60 is briefly as follows. Assuming that the operator is seated in the operator's seat 24 and that the door 20 is closed, the lock member 66 will be in its deactivated position shown in solid lines in FIG. 4. The operator can then move the control lever 42 fore-and-aft or sideways to effectuate actuation of control valves (not shown) which are connected to the control rods 52 and 56.

If the operator should then for some reason decide to leave the cab 10, he will open the door 20 which will result in the abutment member 84 moving out of engagement with the rod 78 whereupon the spring 74 will act to rotate the lock member 66 downwardly so as to capture the pin 62 in the vertical opening 72 of the strap portion 70. Then if the operator should bump the lever 42 while on his way through the door opening 18, the lever 42 will remain in its neutral positon.

Upon reentering the cab 10, the operator will upon being again seated, close the door 20 resulting in the abutment member 84 coming into engagement with the actuator rod 78 which forces the rod 78 inwardly relative to the housing 32 resulting in the lock member 66 rotating such that the strap portion 70 is elevated away from the pin 62. The lever 42 is then free for operation at the will of the operator.

Thus, it will be appreciated that a simple lock mechanism is provided for preventing the lever 42 from being accidently bumped into an actuating position when the operator is leaving or entering the cab.

I claim:

1. In a vehicle having an enclosed cab in which is located a seat, a passageway leading from one side of the cab to the seat, a door forming a portion of the cab at said one side and mounted for movement between open and closed positions for respectively allowing and preventing an operator to move between the passageway and a location exteriorly of the cab, a control lever located adjacent the seat and the door when the latter is closed, and the lever being supported for movement at least between an inoperative position and an operative position, the improvement comprising: a locking mechanism including a lock member mounted adjacent the lever for movement between latched and released positions wherein it respectively blocks movement of the lever from said inoperative to said operative position and permits movement of the lever between said operative and inoperative positions; biasing means urging said lock member towards said latched position, and actuator means operatively associated with the door for holding said lock member in said released position only when the door is closed.

2. The vehicle defined in claim 1, wherein said locking mechanism includes a pin fixed to said lever and said lock member including an opening disposed for receiving said pin when the lever is in its inoperative position and the lock member moves to its latched position.

3. The vehicle defined in claim 2, wherein the lock member is pivotally mounted for swinging movement between its latched and released positions.

4. The vehicle defined in claim 3, wherein said pin projects vertically when the lever is in its inoperative position and said lock member being mounted for pivoting vertically about a fore-and-aft horizontal pivot axis.

5. The vehicle defined in claim 4, wherein said lock member includes an actuating rod which extends generally horizontally when the lock member is in its latched position; and said door includes an abutment disposed for engaging said rod and moving said lock member to its unlatched position when the door is moved to its closed position.

6. The vehicle defined in claim 5, wherein the lock member includes, as viewed in its latched position, a horizontal strap portion and a vertical leg portion; said opening being located in the horizontal strap portion; and said actuating rod being in the form of a set screw adjustably threadedly received in the vertical leg portion.

7. In combination with a control linkage mounted inside a cab adjacent a door therof and including a control lever so located as to be accidentally engageable and shiftable from a neutral position to an operative position by an operator passing between a seat in the cab and an opening normally closed by the door, a locking mechanism for retaining the lever in its neutral position when the door is open, comprising: a lock member movably mounted in the cab, between the door opening and the linkage, for movement between a first position wherein it is free of the linkage and a second position wherein it is blockingly disposed relative to the linkage for preventing movement of the lever from said neutral position; resilient means urging said lock member towards said second position; said lock member including an operating portion disposed such as to be engaged by the door, only when the latter is closed, so as to hold the lock member in its first position.

8. The combination defined in claim 7, wherein said locking mechanism includes a pin fixed to said lever and said lock member including an opening disposed for receiving said pin when the lever is in its inoperative position and the lock member moves to its latched position.

9. The combination defined in claim 8, wherein the lock member is pivotally mounted for swinging movement between its first and second positions.

10. The combination defined in claim 9, wherein said pin projects vertically when the lever is in its inoperative position and said lock member being mounted for pivoting vertically about a fore-and-aft horizontal pivot axis.

11. The combination defined in claim 10, wherein said lock member includes an actuating rod which extends generally horizontally when the lock member is in its latched position; and said door includes an abutment disposed for engaging said rod and moving said lock member to its unlatched position when the door is moved to its closed position.

12. The combination defined in claim 11, wherein the lock member includes, as viewed in its latched position, a horizontal strap portion and a vertical leg portion; said opening being located in the horizontal strap portion; and said actuating rod being in the form of a set screw adjustably threadedly received in the vertical leg portion.

\* \* \* \* \*